US009811290B2

(12) United States Patent
Schmidt

(10) Patent No.: US 9,811,290 B2
(45) Date of Patent: Nov. 7, 2017

(54) METHOD AND DEVICE TO LOCATE A PRINT JOB IN A PRINTING CENTER

(71) Applicant: Oce Printing Systems GmbH & Co. KG, Poing (DE)

(72) Inventor: Joerg Schmidt, Munich (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 14/947,275

(22) Filed: Nov. 20, 2015

(65) Prior Publication Data
US 2016/0147485 A1    May 26, 2016

(30) Foreign Application Priority Data

Nov. 20, 2014 (DE) .................. 10 2014 116 964

(51) Int. Cl.
*G06F 3/12* (2006.01)
*G06Q 10/08* (2012.01)

(52) U.S. Cl.
CPC .......... *G06F 3/1207* (2013.01); *G06F 3/1259* (2013.01); *G06F 3/1282* (2013.01); *G06Q 10/08* (2013.01)

(58) Field of Classification Search
CPC .... G06F 3/1207; G06F 3/1259; G06F 3/1282; G06Q 10/08
See application file for complete search history.

(56) References Cited

U.S. PATENT DOCUMENTS

| 2006/0124738 | A1* | 6/2006 | Wang | G06K 7/10079 235/385 |
| 2008/0224867 | A1* | 9/2008 | Rehman | G06Q 10/08 340/572.1 |
| 2009/0314836 | A1* | 12/2009 | Kothari | G06Q 10/08 235/385 |
| 2013/0010321 | A1* | 1/2013 | Shen | H04N 1/0057 358/1.13 |
| 2013/0335464 | A1 | 12/2013 | Gerber | |
| 2016/0067964 | A1* | 3/2016 | Hitzlsperger | B41J 2/04586 347/10 |

FOREIGN PATENT DOCUMENTS

| DE | 102010041837 A1 | 4/2012 |
| EP | 1939800 A1 | 7/2008 |

* cited by examiner

*Primary Examiner* — Eric A Rust
*Assistant Examiner* — Pawandeep Dhingra
(74) *Attorney, Agent, or Firm* — Schiff Hardin LLP

(57) ABSTRACT

In a method or print job administrator to determine status of a print job, a print job is printed on a recording medium. An ID of a transport on which the recording medium is located is determined, the recording medium being printed to according to the print job. The transport has a positioner. A position of the transport is determined using the positioner, the positioner comprising an active RFID transponder arranged at the transport and supplied with power. The determining of the position of transport includes receipt of position data with regard to the position of the transport from a plurality of distributed RFID readers. The determining of the position of the transport occurs by using the position data of the plurality of distributed RFID readers.

9 Claims, 2 Drawing Sheets

METHOD AND DEVICE TO LOCATE A PRINT JOB IN A PRINTING CENTER

BACKGROUND

The disclosure concerns a method and a device to locate print jobs in a printing center.

With printing systems (in particular with high-capacity printing systems), a plurality of different print jobs are typically executed in relatively short time periods. Such print jobs are often administered in a print job administrator (for example in an Output Management System (OMS)) to which the one or more printing systems are connected. However, for the most part the status of a print job can thereby be tracked using the OMS only up to the point in time at which the print job has been completely printed to a recording medium by a printer of the printing system.

SUMMARY

It is an object to provide a method and a corresponding device via which it is enabled to reliably determine the status of the print job—in particular a current position of the print job—even after the printing of the print job.

In a method or print job administrator to determine status of a print job, a print job is printed on a recording medium. An ID of a transport on which the recording medium is located is determined, the recording medium being printed to according to the print job. The transport has a positioner. A position of the transport is determined using the positioner, the positioner comprising an active RFID transponder arranged at the transport and supplied with power. The determining of the position of the transport includes receipt of position data with regard to the position of the transport from a plurality of distributed RFID readers. The determining of the position of the transport occurs by using the position data of the plurality of distributed RFID readers.

DESCRIPTION OF EXEMPLARY EMBODIMENTS

Figure 1:
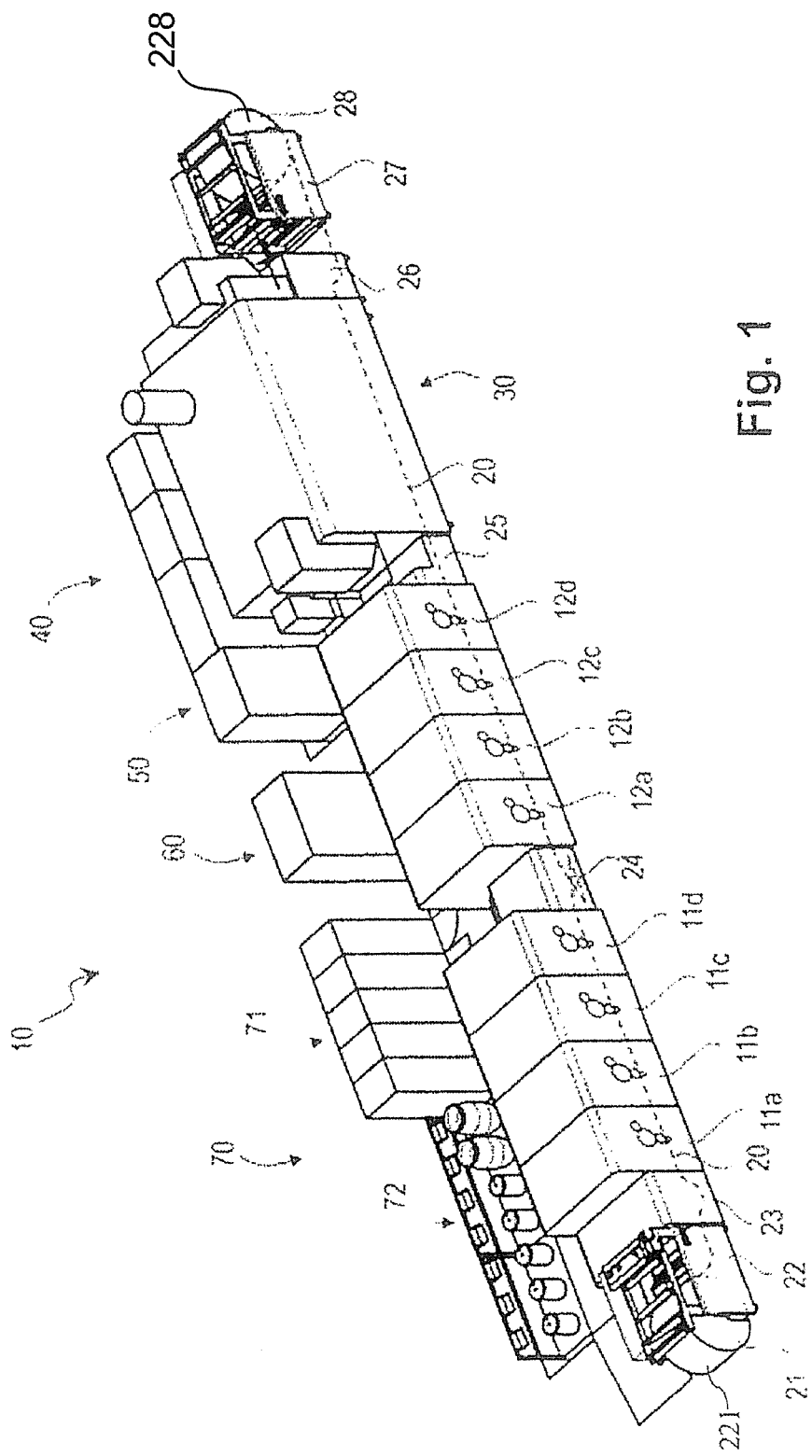
FIG. 1 is a view of a printing system using an example configuration of a digital printer for roll paper (roll-to-roll configuration)

For the purposes of promoting an understanding of the principles of the invention, reference will now be made to the preferred exemplary embodiments/best mode illustrated in the drawings and specific language will be used to describe the same. It will nevertheless be understood that no limitation of the scope of the of the invention is thereby intended, and such alterations and further modifications in the illustrated embodiments and such further applications of the principles of the invention as illustrated as would normally occur to one skilled in the art to which the invention relates are included herein.

According to one aspect, a method for determining the status of a print job is described. The method includes the initiation of the print job being printed on a recording medium. Furthermore, it may be initiated that an ID (or an identifier) of the print job is printed on the recording medium. The method furthermore includes the determination of an ID (or an identifier) of a transport on which the recording medium is located, which recording medium is printed to according to the print job. The transport thereby has a positioner. Moreover, the method includes the determination of a position of the transport using the positioner.

According to a further aspect, a print job administrator (for example an Output Management System) for a printing system is described. The print job administrator is set up to initiate a print job being printed on a recording medium by the printing system. Furthermore, it may be initiated that an ID of the print job is printed on the recording medium. The print job administrator is additionally set up to determine an ID of a transport on which the recording medium is located, which recording medium is printed to according to the print job. The transport thereby has a positioner. Moreover, the print job administrator is set up to determine a position of the transport using the positioner.

According to a further aspect, a software (SW) program is described. The SW program may be set up in order to be executed on a processor (for example on a computer/server) and in order to thereby execute a method described in this document.

According to a further aspect, a storage medium is described. The storage medium may include a SW program which is set up in order to be executed on a processor, and in order to thereby execute a method described in this document.

In the following, exemplary embodiments are described in detail using schematic drawings.

According to FIG. 1, a digital printer 10 for printing to a recording medium 20 has one or more print groups 11a-11d and 12a-12d that print a toner-based print image onto the recording medium 20. As shown, a web-shaped recording medium 20 is unspooled from a roll 21 with the aid of a take-off 22 and is supplied to the first print group 11a. The roll 21 is typically arranged on a movable transport 221 (for example on a roll core) in order to be able to move the roll 21 with the recording medium 20 to the digital printer 10. The print image 20' is fixed on the recording medium 20 in a fixer 30. The recording medium 20 may subsequently be taken up on a roll 28 with the aid of a take-up 27. The roll 28 is typically arranged on a movable transport 228 (a roll core, for example) in order to be able to move the roll 28 with the printed recording medium 20 away from the digital printer. A configuration shown in FIG. 1 is also designated as a roll-to-roll printing system. Alternatively, at the output of the fixer 30 the recording medium 20 may be divided up into individual sheets by a cutter or sheet cutter (not shown). The sheets may then also be received at a suitable movable transport (for example on a palette or in a container) at the end of the digital printer 10.

FIG. 1 depicts a digital printer 10 based on the electrophotographic principle. It is noted therein that the exemplary embodiment described in this document is also applicable to other types of digital printers 10 (for example other types of toner printers, ink printers and also offset printers).

In the configuration shown in FIG. 1, the web-shaped recording medium 20 is printed to in full color on the front side with four print groups 11a through 11d, and on the back side with four print groups 12a through 12d (what is known as a 4/4 configuration). For this, the recording medium 20 is unwound from the roll 21 by the take-off 22 and supplied to the first print group 11a via an optional conditioning group 23. In the conditioning group 23, the recording medium 20 may be pre-treated or coated with a suitable substance. Wax, or chemically equivalent substances, may preferably be used as a coating substance (also designated as a primer).

The recording medium 20 is subsequently supplied first, in order, to the first print groups 11a through 11d, in which only the front side is printed to. Each print group 11a-11d typically prints to the recording medium 20 in a different color, or also with a different toner material (for example MICR toner which can be read electromagnetically).

After printing to the front side, the recording medium 20 may be turned in a turner 24 and be supplied to additional print groups 12a-12d for printing to the back side. In the region of the turner 24, an additional conditioning group (not shown in FIG. 1) may be arranged via which the recording medium 20 is prepared for the printing to the back side. It is thus prevented that the front side print image is mechanically damaged upon further transport through the subsequent print groups.

Typically, a register 25 is arranged after the print group 12d, via which register 25 registration marks—which are printed on the recording medium 20 independently of the print image 20' (in particular outside of the print image 20')—are evaluated. The transversal and longitudinal registration (the primary color dots that form a color point should be arranged atop one another or spatially very close to one another; this is also designated as color registration or four-color registration) and the register (front side and back side must spatially coincide precisely) can therefore be adjusted so that a qualitatively good print image 20' is achieved.

Arranged after the register 25 is the fixer 30 via which the print image 20' is fixed on the recording medium 20. Arranged after the fixer 30 is a puller 26 that pulls the recording medium 20 through all print groups 11a-12d and the fixer 30 without an additional drive being arranged in this region. The danger that the as of yet unfixed print image 20' could be smeared would exist due to a friction drive for the recording medium 20.

The puller 26 feeds the recording medium 20 to the take-up 27, which rolls up the printed recording medium 20. Alternatively, the recording medium 20 may be cut by a sheet cutter into individually printed sheets.

Centrally arranged in the print groups 11, 12 and the fixer 30 are all supply devices for the digital printer 10, such as air-conditioners 40, power supply 50, controller 60, fluid managers 70 (such as fluid control 71 and reservoirs 72 of the different fluids). In particular, pure carrier fluid, highly-concentrated liquid developer (high proportion of toner particles in relation to carrier fluid) and serum (liquid developer plus charge control substances) are required as fluids in order to supply the digital printer 10, as well as waste containers for fluids to be disposed of or containers for cleaning fluid.

The recording medium 20 may be manufactured from paper, paperboard, cardboard, metal, plastic and/or other suitable printable materials.

Figure 2:
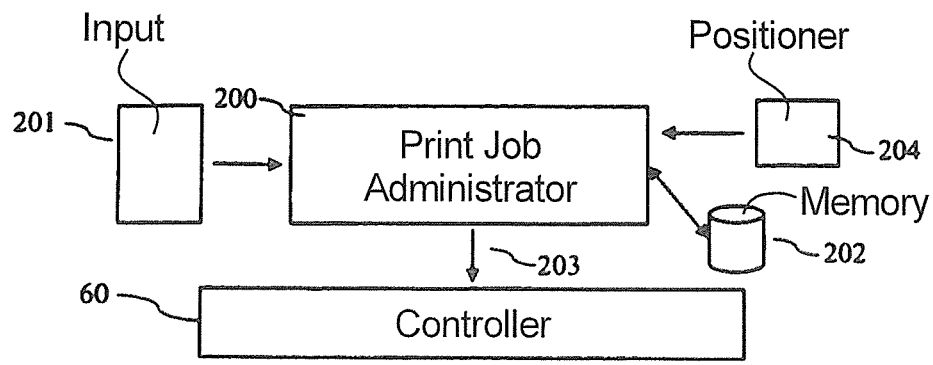
FIG. 2 shows example components of a printing system.

FIG. 2 shows example components of a printing system which comprises a print job administrator 200 comprising a computer and/or processor run by software and the controller 60 of the digital printer 10 which also comprises the same or different computer and/or processor run by software. The print job administrator 200 comprises a printer driver that is set up to transfer a print job to the controller 60 of the digital printer 10. The print job may in particular include the print data 203 that are to be printed. Furthermore, print resources for the print job may be communicated to the controller 60. The print resources and/or print data 203 may be stored in a memory 202 of the print job administrator 200. The print resources and/or print data 203 may be transferred to the controller 60 via an interface, for example an IPDS (Intelligent Printer Data Stream) interface.

The print job administrator 200 is set up to administer one or more print jobs. In particular, the print job administrator 200 is set up to establish a sequence of print jobs and to ensure that the sequence of print jobs may be printed by the digital printer 10 such that the recording medium 20 may be printed to optimally without stopping the digital printer 10.

As soon as a print job has been printed onto a recording medium 20, the print job may be marked as executed in the print job administrator 200. The print job is then present as a physically printed recording medium 20. For example, the executed print job corresponds to one or more printed rolls 28 (or also to only a portion of a roll 28) and/or to a plurality of printed sheets. Typically, on which roll 28 (or on which rolls 28) and/or on which sheets the executed print job is located is not to be learned from the print job administrator 200. If the identification takes place only via a job ID (for example a bar code on the recording medium 20) of the print job, this may lead to logistical problems in identifying and locating an executed print job (i.e. the printed recording medium) efficiently at a later point in time.

As presented above, recording media 20 are typically arranged on movable transports 221, 228. For example, the transports 221, 228 may be carriers for rollers 21, 28 or palettes to bear sheets. The unprinted or printed recording media 20 may be borne by means of the movable transports 221, 228 and be moved between storage and printer 10.

In the print job administrator 200, a print job typically has an ID (i.e. a job ID) via which the print job may be uniquely identified. For example, this job ID may be transferred to the recording medium 20 using an electronically readable feature (for example via a barcode). Furthermore, the movable transports 221, 228 may be provided with an ID via which a movable transports 221, 228 may be uniquely identified. In the course of execution, a print job may be associated with one or more IDs of the movable transports 221, 228 that bear a recording medium 20 that is used for the realization of the print job. For example, the transport 221 of the roll 21 may be associated with a print job by which at least a portion of the recording medium 20 is printed to with the print data of the print job. Furthermore, the transport 228 of the roll 28 may be associated with the print job on which the recording medium 20 is located, which recording medium 20 has been printed to with the print data of the print job.

In particular, one or more IDs of transports 221, 228 may thus be stored with the ID of a print job and be retrieved as needed. Even after completion of a print job, it may thus be determined on which transport 228 the correspondingly printed recording medium 20 is located.

The transports 221, 228 may have respective positioners that enable the transports 221, 228 to be located. An example positioner is an RFID (Radio Frequency IDentification) transponder. In particular, it may be an active RFID transponder that is supplied with power, and thus may be identified via a suitable reader even over longer ranges. Alternatively or additionally, a GPS (Global Positioning System) receiver may be used as a positioner.

In other words, a transport 221, 228 may have a structure that enables the transport 221, 228 to be spatially located. The location may take place using a plurality of distributed RFID readers via which it may be determined at which location (for example at which location within a storage) the transport 221, 228 is located. Given use of a GPS receiver, the coordinates determined by the GPS receiver may be used to locate the transport 221, 228. The determined coordinates may be sent from a transmission module to the transport 221, 228. The GPS receiver and the transmitter may be part of a GPS transmitter or GPS tracker.

The print job administrator 200 may be set up to detect the ID of a print job and the IDs of the transports 221, 228 used within the scope of the execution of a print job (for example by means of an input 201). The input 201 may, for example, be a scanner or an RFID reader or a GPS-ID reader. Furthermore, the print job administrator 200 may be set up to determine a position of a transport 221, 228 that is used (for example by means of a positioner 204). For example, the positioner 204 may comprise an RFID reader or a module to receive GPS coordinates. The position of a transport 221, 228 that we used may be stored within the framework of the print job. The status (and in particular the storage location) of a print job may thus also be reliably determined even after execution of said print job.

The print job administrator 200 may additionally be set up to update the one or more transport IDs that are used for a print job. In particular, it may be ensured that the one or more transport IDs of the one or more transports 221, 228 on which the recording medium 20 of a print job is currently located may be identified at any point in time. For example, the print job administrator 200 may ensure that only the currently valid transport IDs (the currently used one or more transports 221, 228) are associated with a print job. The one or more transport IDs of one or more transports 221, 228 on which the recording medium 20 of the print job is no longer located may be declared invalid and/or be disassociated with the print job. For example, at any point in time a job ID may be associated with only the one or more transport IDs on which the recording medium 20 of the print job of the job ID is currently located. Alternatively, the transport IDs of one or more transports 221, 228 on which the recording medium 20 of a print job has been located in the past may be marked as "no longer used".

Via the use of transport IDs, a production site of print jobs may be monitored efficiently. In particular, an automatic and reliable discovery of a location of printed products or print jobs may be enabled via the use of positioning agents at the transports 221, 228 of a recording medium 20. For example, the location of a print job may be displayed in a storage plan at a suitable display device (computer monitor, tablet, smartphone . . . ) of the print job administrator 200. The time to locate semi-finished or finished products is therefore markedly reduced, which leads to an efficiency increase in the production of printed products.

As presented above, the intermediate products are typically stored on movable rolls as transports 221, 228 (these for the most part include multiple print jobs) or palettes as transports 221, 228 (these for the most part include a print job). A fixed RFID transponder may be associated once with each of these transports 221, 228 and can be attached to the transport 221, 228 (for example directly during manufacturing or upon purchase of a transport 221, 228). The IDs of the transports 221, 228 that are used may be received by the print job administrator 200. A deletion of these object IDs may only take place upon being discarded (for example upon disposal or roll cores that are used for take up at the output of a printer 10, upon throwing away palettes due to breakage etc.). Printed papers may also possibly be provided with an RFID transponder upon delivery.

A printing center may be equipped with RFID readers at specific locations. Example locations are the site of the roll take-off 22, the location of the roll take-up 27, a roll storage, a palette storage, a palette extractor, a palette filler etc.

At the start of a print production, in addition to a job marking (for example a job marking with bar codes) the last stack of a print job may be also be registered by the print job administrator 200 (i.e. by the OMS) after the current finished production step. Not only the content of a print job but also the storage location as of this point in time is therefore known in the print job administrator 200 and may be suitably indicated.

Production steps may thus be executed more quickly because the desired transport 221, 228 may be located at any time. The production of a next step may possibly only continue when both the ID of a transport 221, 228 and a job ID or page ID coincide with previously stored data in the print job administrator 200. Errors in the course of production may thus be avoided.

Figure 3:
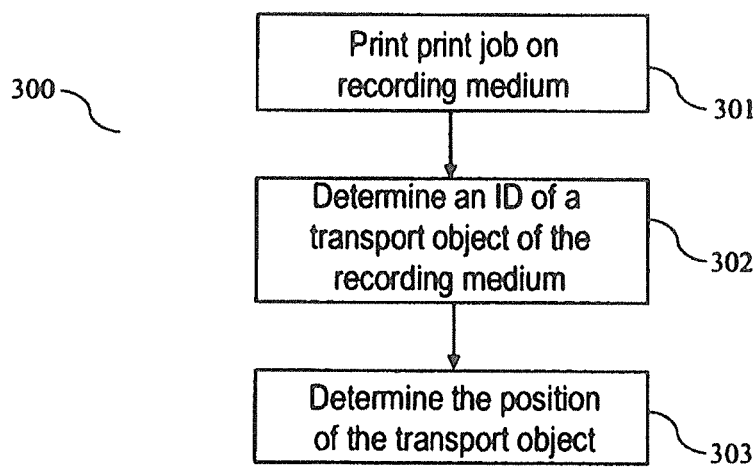
FIG. 3 illustrates a workflow diagram of an example method to determine the status of a print job.

FIG. 3 shows a workflow diagram of an example method 300 to determine the status of a print job. In particular, a print job may be located using the described method 300. The method 300 includes the trigger 301 that the print job is printed on a recording medium 20. In particular, a printer 10 may be triggered to print the print data of the print job onto the recording medium 20. Furthermore, it can be triggered that a job ID (a bar code, for example) of the print job is printed onto the recording medium 20.

The method 300 furthermore includes the determination 302 of an ID of a transport 221, 228 on which the recording medium 20 printed according to the print job is located. The transport 221, 228 thereby has (in particular electronic) a positioner via which a position of said transport 221, 228 may be determined automatically. The positioner may in particular include an RFID transponder that is arranged and/or attached to the transport 221, 228. Alternatively or additionally, the positioner may include a GPS receiver that is arranged and/or attached to the transport 221, 228. The GPS receiver may be set up to determine GPS coordinates of the transport 221, 228. Furthermore, the transport 221, 228 may comprise a transmitter that is set up to send the determined GPS coordinates. The position of the transport 221, 228 may then be determined by a print job administrator 200 on the basis of the sent GPS coordinates. The GPS receiver and the transmitter may be part of a GPS tracker or a GPS transmitter that is arranged at the transport 221, 228.

The method 300 additionally includes the determination 303 of a position of the transport 221, 228 using the positioner. A created print job may thus be effectively located, whereby a further processing of said print job is facilitated and accelerated.

The transport 221, 228 may comprise a support for a roll 21, 28 with a belt-like recording medium 20, in particular given a printer 10 in roll-to-roll configuration or roll-to-sheet configuration. Alternatively or additionally, the transport 221, 228 may include a palette or a transport box for one or more sheets of a sheet-shaped recording medium 20, in particular given a printer 10 in roll-to-sheet configuration or in roll-to-roll configuration.

The method 300 may additionally include the association of the ID of a transport 221, 228 that comprises the unprinted recording medium 20 for the print job with an ID of the print job. The ID of a transport 221, 228 is also designated as a transport ID in this document, and the ID of the print job is also designated as a job ID in this document. An ID is thereby typically a unique designator for a print job or for a transport 221, 228. In other words: an ID enables a print job or a transport 221, 228 to be uniquely identified within the print job administrator 200. For example, an ID may include a plurality of characters (letters, digits, special characters etc.). A print job—for example a storage location of the print job—may be uniquely identified by a job ID. A different job ID may be assigned to each print job processed by the print job administrator 200.

A transport 221, 228 (for example a specific roll core or a specific palette) may be uniquely identified by a transport ID. A different transport ID may be associated with each transport 221, 228 administered by the print job administrator 200. For example, properties of the transport 221, 228 (type of transport 221, 228; color of the transport 221, 228; positioner of the transport 221, 228; etc.) may be determined on the basis of the transport ID. In particular, which positioner (for example which RFID transponder or which GPS transmitter) that the transport 221, 228 (corresponding to the transport ID) may be identified via said transport ID. For example, the positioner may also have an ID which may be designated as a positioner ID. The positioner ID of the positioner may also be determined given determination of the position of a transport 221, 228 using the positioner. The positioner ID may be associated with the transport ID. For example, the positioner ID may correspond to the transport ID; in particular, both IDs may be the same. The position of the positioner and its positioner ID may initially be determined. Due to the association between positioner and the transport ID, the position of the transport 221, 228 may then be determined with the corresponding transport ID.

The method 300 may additionally include the association of the ID of the transport 221, 228—on which is located the recording medium 20 that is printed to according to the print job—with the ID of said print job. The one or more associations between the ID of the print job and an ID of the transport 221, 228 may be stored. In particular, these one or more associations may be stored in connection with the ID of the print job.

Furthermore, given a change of the recording medium 20 for the print job from a first transport 221 to a second transport 228, the ID of the print job may be associated with the ID of the second transport 228, and the ID of the print job may be disassociated with the ID of the first transport 221. In other words: given a change of the transports 221, 228 in the processing process, the current validity of the IDs of the transports 221, 228 may be taken into account and tracked.

Via the association of the IDs of the currently used one or more transports with the ID of the print job, the one or more IDs of the one or more (currently) relevant transports 221, 228 may be determined simply by querying the ID of the print job. In particular, the determination 302 of the ID of the transport 221, 228 may thus include the determination of an ID of the print job and the determination of one or more transports 221, 228 that are associated with the ID of the print job (possibly at a current point in time).

Furthermore, a more permanent update of the transports 221, 228 may take place in order to ensure that the currently used one or more transports 221, 228 may be determined at any point in time. For this, associations with one or more no longer used transports 221, 228 may be deleted.

The determination 303 of the position of the transport 221, 228 may include the receipt of position data with regard to the position of the transport 221, 228 from an RFID reader (given use of an RFID transponder) and/or from a GPS transmitter (that may be arranged at the transport 221, 228, for example). A printer 10 to print the print job may, for example, comprise a take-off 22 (for a roll 21). The RFID reader may be arranged such that a transport 221 at the take-off 22 may be detected. Alternatively or additionally, the printer 10 may include a take-up 27. The RFID reader may then be arranged such that a transport 228 at the take-up 27 may be detected. Alternatively or additionally, a printed recording medium 20 may be stored at one or more locations in a storage. RFID reader may be arranged at the one or more locations so that it may be determined at which of the one or more locations a transport 221, 228 is located.

Given use of a GPS transmitter that is arranged a the transport 221, 228, a GPS receiver of the GPS transmitter may determine the current position of the transport 221, 228. A transmitter (for example a GPRS, UMTS or LTE transmitter) of the GPS transmitter may send the determined position (for example the determined GPS coordinates) of the transport 221, 228 in a transmission signal. A recipient of the transmission signal (for example the print job administrator 200) may then determine the current position of the transport 221, 228.

The method 300 may additionally include the storage of the determined position of the transport 221, 228 in connection with the ID of the print job. The current position the print job may thus also be efficiently provided (for example via indication of the position on a monitor of the print job administrator 200) by querying the ID of said print job.

The print job administrator 200 may be set up with software run on a processor or computer to execute the method 300 described in this document. Furthermore, the print job administrator 200 may be set up with software run on a processor or computer in order to output information with regard to the determined position of a transport 221, 228 (and thus of a corresponding print job) to an output (on a monitor, for example) of the print job administrator 200.

A quick location of materials and/or print jobs is enabled via the method described in this document. Furthermore, a duplicate monitoring of the accuracy of the semi-finished products for a corresponding production job—and thus a reduction of possible error sources—is enabled.

REFERENCE LIST

10 digital printer
11, 11a-11d print group (front side)
12, 12a-12d print group (back side)
20 recording medium
21 roll (input)
22 take-off
23 conditioning group
24 turner
25 register
26 puller
27 take-up
28 roll (output)
30 fixer
40 climate controller
50 power supply
60 controller
70 fluid manager
71 fluid controller
72 storage reservoir
200 print job administrator
201 input
202 memory of the print job administrator
203 print data/resources
204 positioner
221, 228 transport
300 method to determine the status of a print job
301, 302, 303 method steps Although preferred exemplary embodiments are shown and described in detail in the drawings and in the preceding specification, they should be viewed as purely exemplary

I claim as my invention:

1. A method to determine status of a print job within a printing center, the method comprising:
   initiating printing of the print job on a web-shaped recording medium using a digital printer, the recording medium being unspooled from a first transport using a take-off device and the recording medium being taken up on a second transport using a take-up device, wherein:
   the first transport includes a support for a roll with the web-shaped recording medium, and
   the second transport includes a support for a roll with the web-shaped recording medium or a palette for one or more sheets cut from the web-shaped recording medium;
   determining an ID of the first transport on which the recording medium is located, said recording medium being printed to according to the print job, and the first transport having a first positioner;
   associating an ID of the print job with the ID of the first transport;
   given a change of the recording medium for the print job from the first transport to the second transport having a second positioner, disassociating the ID of the print job from the ID of the first transport and associating the ID of the print job with the ID of the second transport; and
   determining positions of the first and the second transport using the first and the second positioners, respectively, the first and the second positioners each comprising an active RFID transponder arranged at the first and second transport, respectively, and supplied with power, the determining of the position of the first and second transports including receiving position data from a plurality of distributed RFID readers being positioned at different locations within the printing center, wherein:
   the position data is associated with the different locations of the RFID readers,
   the different locations include a location of the take-up device, a location of the take-off device and a location of a storage configured to store the second transport, and
   the determining of the positions of the first and second transports is based on the received position data and the associated locations of the plurality of distributed RFID readers.

2. The method according to claim 1 wherein the first or second positioner additionally comprises a GPS receiver arranged at the first or second transport, respectively.

3. The method according to claim 1 wherein the determining of the ID of the first or second transport includes:
   determining the ID of the print job; and
   determining one or more transports that are associated with the ID of the print job.

4. The method according to claim 1 wherein:
   the first transport comprises the unprinted recording medium; and
   the second transport is the transport on which the recording medium is located, said recording medium having been printed to according to the print job.

5. The method according to claim 4 further comprising: storing an association between the ID of the print job and the ID of the first transport or the ID of the second transport.

6. The method according to claim 1 wherein the recording medium lacks a positioner.

7. The method according to claim 6 wherein the positioner is an RFID transponder.

8. A print job administrator for a printing system within a printing center, wherein the print job administrator is configured to:
   initiate a print job being printed on a web-shaped recording medium by the printing system, the recording medium being unspooled from a first transport using a take-off device and the recording medium being taken up on a second transport using a take-up device, wherein:
   the first transport includes a support for a roll with the web-shaped recording medium, and
   the second transport includes a support for a roll with the web-shaped recording medium or a palette for one or more sheets cut from the web-shaped recording medium;
   determine an ID of the first transport on which is located the recording medium to be printed to according to the print job, the first transport having a first positioner;
   associate an ID of the print job with the ID of the first transport;
   given a change of the recording medium for the print job from the first transport to the second transport having a second positioner, disassociate the ID of the print job from the ID of the first transport, and to associate the ID of the print job with the ID of the second transport; and
   determine positions of the first and second transports using the first and second positioners, respectively, the first and second positioners each comprising an active RFID transponder arranged at the first and second transport, respectively, and supplied with power, the determination of the position of the first and second transports including receiving position data from a plurality of distributed RFID readers being positioned at different locations within the printing center, wherein:
   the position data is associated with the different locations of the RFID readers,
   the different locations include a location of the take-up device, a location of the take-off device and a location of a storage configured to store the second transport, and
   the determination of the positions of the first and second transport being based on the received position data and the associated locations of the plurality of distributed RFID readers.

9. The print job administrator according to claim 8 wherein the print job administrator is further configured to output information regarding the position of the first or second transport to an output of the print job administrator.

* * * * *